Sept. 9, 1958

G. I. WELSH 2,850,922

DIFFERENTIAL TRANSMISSION

Filed March 3, 1958

INVENTOR
George I. Welsh
by Carlson, Pitzner, Hubbard & Wolfe
ATTORNEY

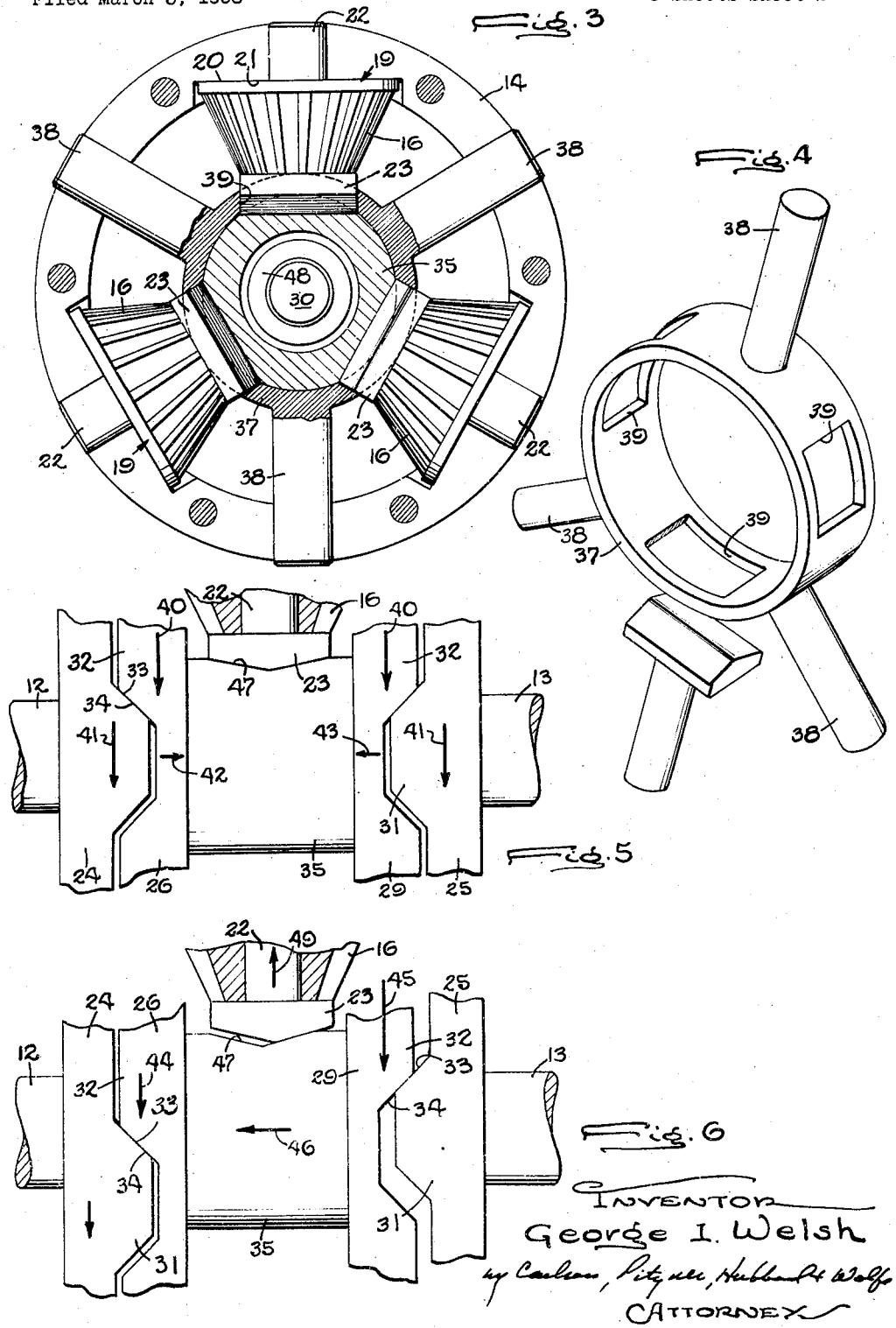

Sept. 9, 1958 G. I. WELSH 2,850,922
DIFFERENTIAL TRANSMISSION
Filed March 3, 1958 3 Sheets-Sheet 3
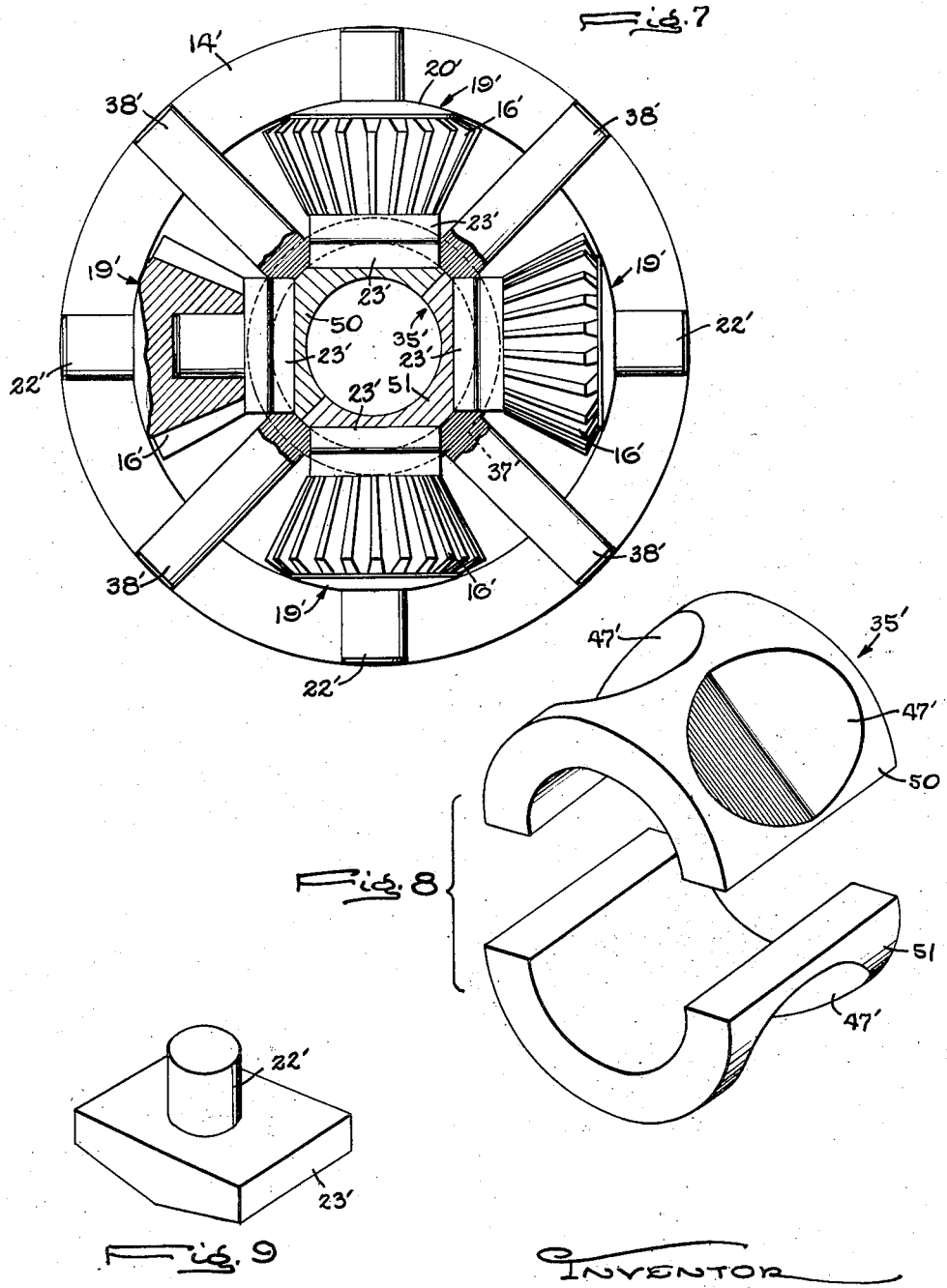
INVENTOR
George I. Welsh
by Carlson, Pitzner, Hubbard & Wolfe
ATTORNEY United States Patent Office
2,850,922
Patented Sept. 9, 1958

2,850,922

DIFFERENTIAL TRANSMISSION

George I. Welsh, Dixon, Ill.

Application March 3, 1958, Serial No. 718,755

6 Claims. (Cl. 74—711)

This invention relates to a differential transmission such as may be used to transmit torque to the rear axles of a vehicle and, more particularly, to a transmission of the type in which the pinion is frictionally locked automatically to the transmission housing whenever more torque is delivered to one axle than to the other so that the transmission is locked up and equal torques are delivered to both axles.

The general object of the invention is to provide a new and improved transmission, which although relatively simple in construction, produces a comparatively large friction force which effectively locks up the transmission under those conditions of service use in which it is desired to transmit equal torques.

A more detailed object is to provide a transmission with a cam which is shifted when there is a difference in the torques delivered to the two axles and which produces, as a result of such shifting, a friction force for locking the pin to the housing.

The invention also resides in the novel construction and arrangement of the cam for producing the friction force.

Other objects and advantages of the invention will become apparent from the following detailed description taken in connection with the accompanying drawings, in which:

Figure 3 is a sectional view taken along the line 3—3 in Figure 1.

Figure 4 is a perspective view of a part used to mount the cam mechanism.

Figure 5 is a schematic development view of a portion of the cam mechanism.

Figure 6 is a view similar to Figure 5 but showing the parts in a different position.

Figure 7 is a transverse sectional view of a modified form of the invention.

Figure 8 is an enlarged perspective view of the cam used in the form shown in Figure 7.

Figure 9 is a perspective view of the follower used in connection with the cam of Figure 8.

Figure 1:
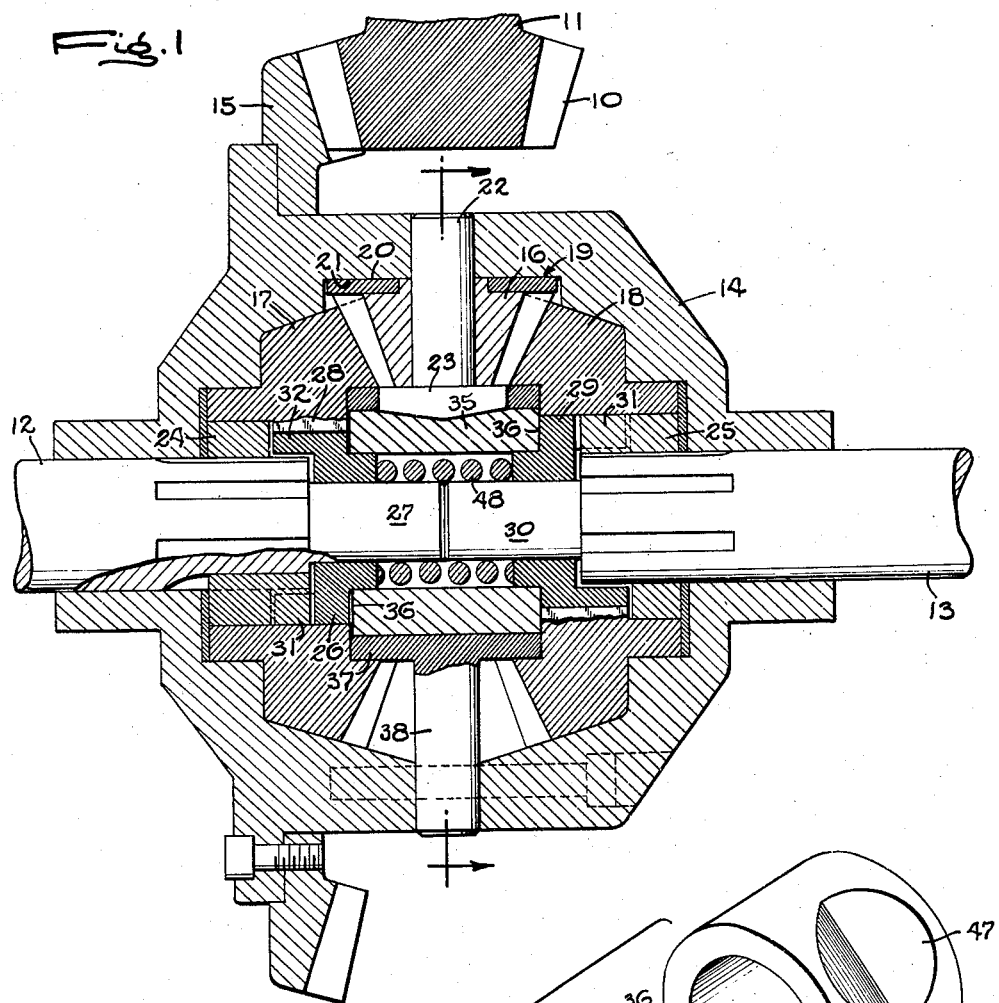
Figure 1 is a longitudinal sectional view of a differential transmission embodying the novel features of the present invention.

As shown in the drawings for purposes of illustration, the invention is particularly adapted for use in connection with a differential transmission of the type usually employed in a vehicle such as an automobile, a tractor, or a truck. The transmission is driven by a bevel gear 10 on the end of the propeller shaft 11 of the vehicle and transmits the power from this shaft to the rear wheel axles 12 and 13.

In general, the transmission includes a housing 14 to which is bolted a bevel gear 15 meshing with the bevel gear 10 on the propeller shaft 11. The housing is journaled on the axles 12 and 13 to turn about the common axis of the latter and a plurality of pinions 16, herein three in number, are journaled in the housing to turn about axes which extend transversely to the axis of the axles, the pinions being equally spaced angularly around the interior of the housing. Meshing with the pinions are two bevel or crown gears 17 and 18 which are disposed within the housing in opposing relation with the crown gear 17 being concentric with the inner end portion of the axle 12 and the crown gear 18 being concentric with the inner end portion of the other axle 13. The crown gears are connected to their respective axles so that, under normal operating conditions, each crown gear and its axle turn together.

As is well known in the art, a differential transmission of the type described above permits the rear wheels to travel at the same speed or to turn at different speeds as may be necessitated by the vehicle turning a corner. Thus, when the vehicle is traveling in a straight line, the pinions 16 do not turn relative to the housing 14 and, as a result, the entire transmission, that is, the housing, the pinions and the crown gears turn bodily together about the rotational axis. Both axles 12 and 13, therefore, are turned together at the same speed. When the vehicle turns a corner, the pinions will tend to walk around the crown gear which is associated with the inner or slower wheel. This results in the pinions turning relative to the housing so that the other crown gear turns about the rotational axis faster than does the housing. In this way, the wheel on the outside of the turn rotates at a speed faster than the turning of the housing while the inside wheel turns slower than the housing.

Conventional differential transmissions present a problem when one of the wheels loses traction such as when it is turning on ice. In such a case, the crown gear which is associated with the wheel having traction stands still and the pinions 16 turn about this crown gear. This results in the other crown gear turning twice as fast as the housing 14. Thus, all of the power from the propeller shaft 11 is delivered to the wheel which has no traction instead of to the wheel which has traction, the only wheel which can utilize the power.

In order to overcome the problem of the transmission delivering the torque to the wheel which has no traction, means is provided for frictionally holding the pinions against turning relative to the casing so that, in effect, the transmission is locked up and equal torques are delivered to both axles 12 and 13. This means becomes effective automatically as an incident to an excessive difference in the torques delivered to the two axles, that is, a difference which indicates a loss of traction of one of the wheels, and herein comprises one or more friction couplings or brakes 19 which, when engaged, connect the pinions 16 to the housing 14 so that there is no relative turning between the two.

In the form of the invention illustrated in Figs. 1 through 6 there are three such brakes 19, one associated with each of the pinions 16, and each is formed by opposed friction surfaces 20 and 21 formed on the pinion and the housing respectively. The surface 20 may be formed by a ring of wear material secured to the outer end of the pinion while the opposing surface 21 is formed by a recess in the housing. The pinions are mounted on short shafts 22 which slidably project into the housing, the pinions being free to rotate on these shafts, and enlarged heads 23 on the inner ends of these shafts hold the pinions in place. Thus, by moving the shafts radially outwardly of the axles 12 and 13, the brake surfaces 20 and 21 are brought into frictional gripping engagement and the transmission is locked up to deliver equal torques to the axles.

Figure 2:
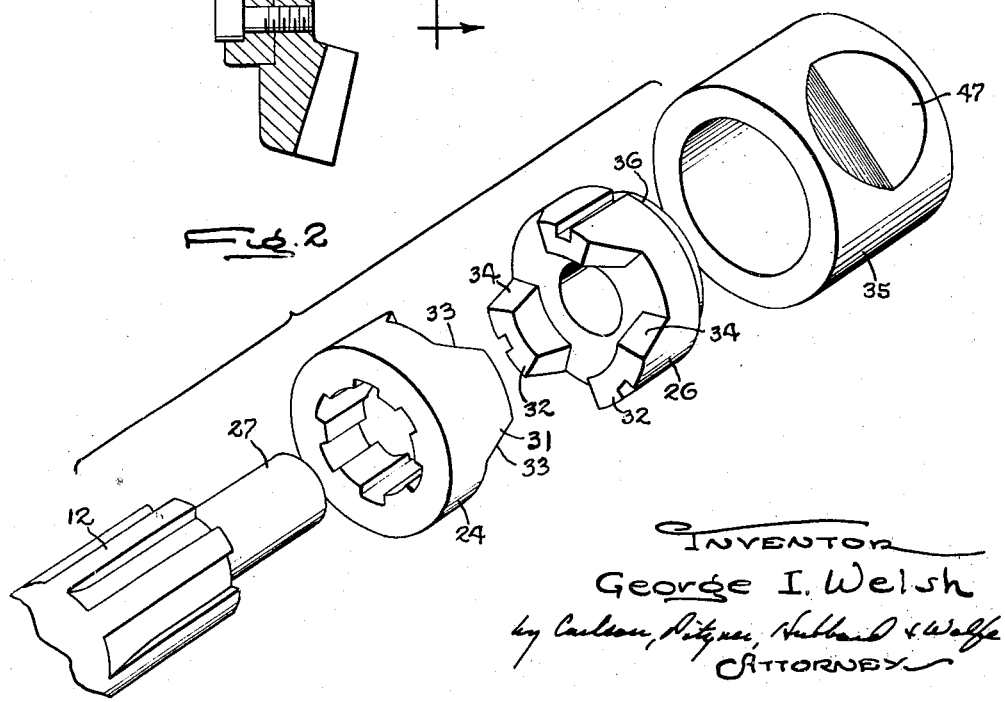
Figure 2 is an exploded view of a portion of the cam mechanism.

To engage the brake automatically under the desired conditions, the torque is transmitted to the axles 12 and 13 through cam means which, when unequal torques are delivered to the axles, produces a motion that is used to cause engagement of the brake surfaces 20 and 21. In the present instance, the cam means are interposed between the crown gears 17 and 18 and their respective axles and includes cam members 24 and 25 splined on the axles 12 and 13 respectively. The cam member 24 cooperates with an annular follower member 26 which is rotatably received on the reduced end portion 27 of the axle 12 and is keyed to the crown gear 17 as indicated at 28 while a similar follower member 29 is keyed to the crown gear 18 and is rotatably received on the reduced end portion 30 of the axle 13 to cooperate with the cam member 25. Each cam member is formed with axially projecting lugs 31 (see Fig. 2) which interfit with similar lugs 32 formed on the corresponding follower member. As shown in Figs. 2 and 5, the opposed surfaces 33 and 34 of the lugs are inclined and the torque is transmitted through these surfaces. Thus, the surfaces 33 and 34 engage each other so that the cam follower member, which turns with the crown gear, produces a turning motion of the cam member and hence the associated axle. A collar 35 is interposed between the follower members 26 and 29 and abuts against shoulders 36 formed on the latter to keep the follower members in engagement with their corresponding cam members.

Surrounding the collar 35 is a sleeve 37 which is fixed to the housing 14 by pins 38 (see Figs. 3 and 4) and which is formed with rectangular holes 39 receiving the heads 23 on the ends of the shafts 22. Thus, the sleeve forms a support for the inner ends of these shafts while the housing supports the outer ends.

With the foregoing arrangement of the cam members 24 and 25 and the follower members 26 and 29, torque from the crown gears 17 and 18 is transmitted to the axles 12 and 13 through the cam surfaces 33 and 34. This torque is transmitted circumferentially as indicated by the arrows 40 and 41 in Fig. 5. When there is equal traction on the two wheels, the torques delivered to the two axles 12 and 13 are equal as indicated by the lengths of these arrows. Because of the inclination of the surfaces 33 and 34, the torques produce axial force components on the follower members 26 and 29 is indicated by the arrows 42 and 43 in Fig. 5. When the torques are equal, these axial forces also are equal and, hence, there is no axial shifting of the follower members and the collar 35.

Should the wheel on the axle 12 lose its traction, then the other axle 13 is capable of reacting against a larger torque, this being indicated by the difference in lengths of the arrows 44 and 45 in Fig. 6. As a result, the longitudinal force component on the follower member 29 will be greater than the comparable force component on the follower member 26. With these forces unbalanced, the follower members and the collar 35 will move to the left as viewed in Fig. 6 and as indicated by the arrow 46.

In accordance with the present invention, the shifting of the follower members 26 and 29 is utlized in a novel manner to produce a comparatvely large radial force which causes engagement of the friction brakes 19. To this end the follower members shift a third cam 47 longitudinally of the axles 12 and 13 and the surfaces of this cam are formed in such a manner as to shift one element of each brake radially into frictional gripping engagement with the other brake element. Herein, there are three such cams 47 and these are formed on the collar 35. The cams are angularly spaced around the collar so that there is one radially alined with each of the pinion supporting shafts 22 and, as shown in Fig. 2, each cam is formed by a comparatively shallow V-shaped notch in the outer periphery of the collar. In other words, the walls of the notch are inclined very gradually and engage the inner side of the corresponding head 23 which is given a complementary shape and constitutes the follower for the cam.

With the foregoing arrangement, the differential transmission functions in the usual manner under normal driving conditions. In other words, one axle may turn faster than the other as required by the particular conditions encountered. Due to the clearances between the follower members 26 and 29 and the collar 35 as well as the corresponding cam members 24 and 25, slight variations in the torques delivered to the two axles are permitted without causing engagement of the brakes 19 so that the latter do not engage except when there has been a substantial loss of traction on one wheel. If desired, these clearances may be taken up under normal driving conditions by the compressing spring 48 which is disposed within the collar 35 and acts between the two follower members 26 and 29.

When one of the vehicle wheels loses traction, for example, the wheel on the axle 12, the other axle 13 tends to stop turning. Thus, as shown by the arrows 44 and 45 in Fig. 6, a greater torque is delivered to the stalled axle and hence there is a greater force tending to shift the follower member 29 to the left than there is tending to shift the follower member 26 to the right. As a result, the two follower members and the collar 35 shift to the left as illustrated by the arrow 46. Such shifting cams the followers 23 radially outwardly as indicated by the arrow 49. This forces the pinions 16 out and brings the brake surfaces 20 and 21 into frictional gripping engagement. Upon such engagement, the pinions are held against turning relative to the housing 14 so that the transmission is locked up. In this condition of the transmission, equal torques are delivered to both of the axles 12 and 13 so that power now is transmitted to the wheel that has traction as well as to the wheel which has no traction. When the wheel on the axle 12 regains its traction, the forces are rebalanced and the parts returned to their normal positions as illustrated in Figs. 1 and 5.

A modified form of the invention is shown in Figs. 7 through 9 in which parts corresponding to the parts of the preferred embodiment are indicated by the same but primed reference characters. In this case, the invention is incorporated in a heavy duty transmission which includes four pinions 16' instead of three. Also, the friction surfaces 20' are formed directly on the outer surfaces of the pinions rather than being provided by separate pieces of wear material. Thus, the brakes 19' engage with metal to metal contact which has been found to be satisfactory in most instances. As shown in Fig. 7, the brake surfaces 20' and 21' are spherical so that the housing 14' need not be cut away and this provides a comparatively rugged construction.

The use of four pinions 16' instead of three presents the problem of centering the sleeve 35' radially so that all of the brakes 19' are fully engaged when the sleeve is shifted axially. In other words, the cams 47' may wear differently with the result that one must be moved out further than the others in order to cause its brake to engage. When three pinions are used as in Fig. 1, this may be compensated for by the sleeve 35 floating radially slightly as permitted by the running clearances between it and the cam followers 26 and 29. That is to say, the sleeve may shift radially in one direction or the other until all of the followers 23 are seated equally in their respective cam surfaces 47 on the sleeve. With four cams 47' and followers 23', however, this is not possible.

In order to overcome the foregoing disadvantage, the sleeve 35' is constructed in a novel manner so that, even though there are four pinions 16' and hence four followers 23', all of the followers are moved to cause full engagement of their respective brakes 19'. This is achieved by splitting the sleeve 35' axially to form two halves 50 and 51 (Fig. 8) with two cams 47 formed on each half. With this arrangement, each half may shift independently of the other to some degree so as to be located in a position in which it engages each of the corresponding cam followers in the same manner. As a result, both of these followers will be moved the same amount upon axial shifting of the sleeve half and, therefore, both of the associated brakes 19' will be engaged. The other sleeve half also is capable of being located in a similar manner and the two brakes associated with that sleeve will be engaged as well. Thus, even though there are four brakes, all will be effective in locking up the transmission when one of the vehicle wheels loses its traction.

It will be observed that a transmission constructed as described above is comparatively simple and inexpensive. At the same time, it produces a friction force at the brakes 19 which effectively locks up the transmission so that equal torques are delivered to the two axles under those conditions where one of the vehicle wheels has lost traction.

I claim as my invention:

1. A differential transmission comprising two alined axles, a rotatable housing journaled on said axles and adapted to be turned by a power driven element, a pair of opposed bevel gears disposed within said housing and arranged coaxially with said axles, a plurality of pinions disposed between and meshing with said bevel gears and journaled in said housing, said pinions being angularly spaced around said axles and mounted to shift radially relative to the axles, a cam member fixed to one of said axles, a follower member mounted on the same axle to slide and turn relative thereto, coacting inclined surfaces formed on said members and operable to transmit torque between the members while producing a force which tends to slide the follower member axially inwardly, second and similar cam and follower members mounted on the other of said axles, means connecting each of said follower members to one of said bevel gears whereby each bevel gear and the associated follower member turn together, a collar disposed between said follower members whereby the follower members and the collar move axially together when one bevel gear transmits more torque than the other, a plurality of brakes each having a friction surface formed on the outer end of a pinion and an opposed friction surface formed on said housing, cam surfaces on said collar, and followers engaging said cam surfaces and movable radially outwardly in response to axial movement of said collar, each of said followers being connected to one of said pinions thereby to shift the pinions outwardly and engage said brakes to transmit equal torques to said axles.

2. A differential transmission comprising two alined axles, a rotatable housing journaled on said axles and adapted to be turned by a power driven element, a pair of opposed bevel gears disposed within said housing and arranged coaxially with said axles, a pinion disposed between and meshing with said bevel gears, said pinion being journaled on said housing to turn bodily therewith, and to move radially relative to said axles, a friction brake having a first friction surface on said housing and a second opposed friction surface on the outer end of said pinion whereby said brake is engaged upon radial outward movement of the pinion, a cam member fixed to one of said axles, a follower member mounted on the same axle to slide and turn relative thereto, coacting inclined surfaces formed on said members and operable to transmit torque between the members while producing a force which tends to slide the follower member axially inwardly, second and similar cam and follower members mounted on the other of said axles, means connecting each of said follower members to one of said bevel gears whereby each bevel gear and the associated follower member turn together, means connecting said follower members to move axially together when one bevel gear transmits more torque than the other, a cam surface movable axially with said follower members, and a follower engaging said cam surface and movable radially in response to axial movement of said surface, said follower being connected to said pinion to move the latter radially outwardly thereby to engage said brake and transmit equal torques to said axles.

3. A differential transmission comprising two alined axles, a rotatable housing journaled on said axles and adapted to be turned by a power driven element, a pair of opposed bevel gears disposed within said housing and arranged coaxially with said axles, a pinion disposed between and meshing with said bevel gears, said pinion being journaled on said housing to turn bodily therewith, a friction brake having one element connected to said housing and another element connected to said pinion, one of said elements being mounted to move radially outwardly relative to said axles and into engagement with the other element, a cam member fixed to one of said axles, a follower member mounted on the same axle to slide and turn relative thereto coacting inclinde surfaces formed on said members and operable to transmit torque between the members while producing a force which tends to slide the follower member axially inwardly, second and similar cam and follower members mounted on the other of said axles, means connecting each of said follower members to one of said bevel gears whereby each bevel gear and the associated follower member turn together, means connecting said follower members to move axially together when one bevel gear transmits more torque than the other, a cam surface movable axially with said follower members, and a follower engaging said cam surface and movable radially in response to axial movement of said surface, said follower being connected to said one brake element to move the latter into engagement with the other element thereby to transmit equal torques to said axles.

4. A differential transmission comprising two alined axles, a rotatable housing journaled on said axles and adapted to be turned by a power driven element, a pair of opposed bevel gears disposed within said housing and arranged coaxially with said axles, a pinion disposed between and meshing with said bevel gears and journaled in said housing, a cam member fixed to one of said axles, a follower member mounted on the same axle to slide and turn relative thereto, coacting inclined surfaces formed on said members and operable to transmit torque between the members while producing a force which tends to slide the follower member axially inwardly, second and similar cam and follower members mounted on the other of said axles, means connecting each of said follower members to one of said bevel gears whereby each bevel gear and the associated follower member turn together, a collar disposed between said follower members whereby the follower members and the collar move axially together when one bevel gear transmits more torque than the other, a cam surface on said collar, a follower engaging said cam surface and movable in response to axial movement of said collar, and means operable in response to predetermined movement of said follower to frictionally clamp said pinion to said housing thereby to transmit equal torques to said axles.

5. A differential transmission comprising two alined axles, a rotatable housing journaled on said axles and adapted to be turned by a power driven element, a pair of opposed bevel gears disposed within said housing and arranged coaxially with said axles, a pinion disposed between and meshing with said bevel gears and journaled in said housing, a cam member fixed to one of said axles, a follower member mounted on the same axle to slide and turn relative thereto, coacting inclined surfaces formed on said members and operable to transmit torque between the members while producing a force which tends to slide the follower member axially inwardly, second and similar cam and follower members mounted on the other of said axles, means connecting each of said follower members to one of said bevel gears whereby each bevel gear and the associated follower member turn together, means connecting said follower members to move axially together when one bevel gear transmits more torque than the other, a cam surface movable axially with said follower members, a follower engaging said cam surface and movable in response to axial movement of said surface, and means operable in response to predetermined movement of said follower to frictionally clamp said pinion to said housing thereby to transmit equal torques to said axles.

6. A differential transmission comprising two alined axles, a rotatable housing journaled on said axles and adapted to be turned by a power driven element, a pair of opposed bevel gears disposed within said housing and arranged coaxially with said axles, four pinions disposed between and meshing with said bevel gears and journaled in said housing, said pinions being angularly spaced around said axles and mounted to shift radially relative to said axles, a cam member fixed to one of said axles, a follower member mounted on the same axle to slide and turn relative thereto, coacting inclined surfaces formed on said members and operable to transmit torque between the members while producing a force which tends to slide the follower member axially inwardly, second and similar cam and follower members mounted on the other of said axles, means connecting each of said follower members to one of said bevel gears whereby each bevel gear and the associated follower member turn together, a collar disposed between said follower members whereby the follower members and the collar move axially together when one bevel gear transmits more torque than the other, said collar being split longitudinally into halves with each half mounted for limited radial floating independent of the other half, four brakes each having a friction surface formed on the outer end of a pinion and an opposed friction surface formed on said housing, four cam surfaces, two formed on each collar half, and four followers, one engaging each of said cam surfaces and each movable radially outwardly in response to axial movement of said collar, each of said followers being connected to one of said pinions thereby to shift the pinions outwardly and engage said brakes.

References Cited in the file of this patent

UNITED STATES PATENTS

| | | |
|---|---|---|
| 1,431,535 | McDonald | Oct. 10, 1922 |
| 2,720,796 | Schou | Oct. 18, 1955 |